United States Patent [19]

Reddersen

[11] Patent Number: 5,202,784
[45] Date of Patent: Apr. 13, 1993

[54] OPTICAL SYSTEM FOR DATA READING APPLICATIONS

[75] Inventor: Brad R. Reddersen, Eugene, Oreg.

[73] Assignee: Spectra-Physics Scanning Systems, Inc., Eugene, Oreg.

[21] Appl. No.: 819,324

[22] Filed: Jan. 10, 1992

[51] Int. Cl.$^5$ .................................. G02B 26/08
[52] U.S. Cl. ............................ 359/196; 359/214; 359/216; 359/221; 235/472; 250/236
[58] Field of Search ............... 359/196, 197, 213, 214, 359/216, 217, 218, 219, 221; 235/462, 467, 472; 250/235, 236

[56] References Cited

U.S. PATENT DOCUMENTS

| | | | |
|---|---|---|---|
| 3,054,899 | 9/1962 | McKnight et al. | 359/206 |
| 3,234,844 | 2/1966 | Fain et al. | 359/214 |
| 3,782,835 | 1/1974 | Abel | 250/236 |
| 3,887,263 | 6/1975 | Thompson, III | 359/216 |
| 4,093,865 | 6/1978 | Nickl | 359/216 |
| 4,257,669 | 3/1981 | Scorteanu et al. | 359/217 |
| 4,283,145 | 8/1981 | Miyazawa | 359/221 |
| 4,387,297 | 6/1983 | Swartz et al. | 235/462 |
| 4,760,248 | 7/1988 | Swartz et al. | 235/472 |
| 4,816,660 | 3/1989 | Swartz et al. | 235/472 |
| 4,820,911 | 4/1989 | Arackellian | 235/467 |
| 4,845,350 | 7/1989 | Shepard et al. | 235/472 |
| 4,962,980 | 10/1990 | Knowles | 359/213 |
| 5,000,529 | 3/1991 | Katoh et al. | 359/216 |

OTHER PUBLICATIONS

The Photonics Dictionary, Book 4, (38th International Ed. 1992), pp. D-92, 57, 89, 111, 118.

Primary Examiner—Loha Ben
Attorney, Agent, or Firm—Lyon & Lyon

[57] ABSTRACT

An optical system and method for data reading including a light source which generates an optical beam directed toward an object, a pivoting scan mirror which directs the optical beam over a scanning range on the object to be read, a stationary collection mirror for collecting light from the object, a fold mirror positioned behind the scan mirror for reflecting light collected by the collection mirror through an aperture in the collection to a photodetector.

27 Claims, 3 Drawing Sheets

OPTICAL SYSTEM FOR DATA READING APPLICATIONS

BACKGROUND OF THE INVENTION

The field of the present invention relates to optical scanning systems and particularly to a scanning system having an improved collection optics. The invention is especially suitable for use in a bar code scanner for reading bar codes such as those found on consumer products, most frequently the UPC code. The invention is suitable for stationary or handheld scanners.

Bar code scanners, as any optical system, require incoming light which has reflected off the target to be focused and detected by a suitable detector. Typically, the incoming light is collected by a collection mirror or a focusing lens and directed to the detector. In long range scanning applications, such as greater than six feet, the collecting proficiency of the optical system becomes critical in order to achieve effective detection. Put simply, light reaching the detector must have adequate intensity for effective detection. The intensity of light reaching the detector is dependent in part on the size of the collection mirror or the focusing lens.

In some detecting systems such as shown in U.S. Pat. No. 4,816,660, the outgoing beam and the incoming beam are "in line" that is on a common scanning structure. In such a system, a pivoting scan mirror operates both as a fold mirror for outgoing light and as a collection mirror for incoming light. Such a system may also require a beam splitter which reduces intensity of incoming light. Though it is desireable to have a large size collection mirror, the larger the collection mirror, the more massive pivoting mechanism is required to accommodate the larger mirror mass thereby further increasing the overall size and weight of the system. The size of the collection mirror is somewhat limited by the load which may be applied to the pivoting mechanism. Moreover, a larger mirror also increases power consumption of the pivoting mechanism. By contrast, a smaller mirror requires a smaller pivoting mechanism and reduces power consumption and by reducing the load on the pivoting mechanism may also enhance the mechanism's reliability.

Other systems which do not have the outgoing beam and the incoming beam reflecting off the same mirror typically have their collection system mounted off axis which may result in much larger size systems.

SUMMARY OF THE INVENTION

The present invention relates to an optical system and method for data reading. The preferred system includes (1) a light source which generates an optical beam directed toward an object, (2) a pivoting scan mirror which directs the optical beam over a scanning range on the object to be read, (3) a stationary collection mirror for collecting light from the object, and (4) a fold mirror reflecting light from the collection mirror to a detector.

DESCRIPTION OF THE PREFERRED EMBODIMENT

Figure 1:
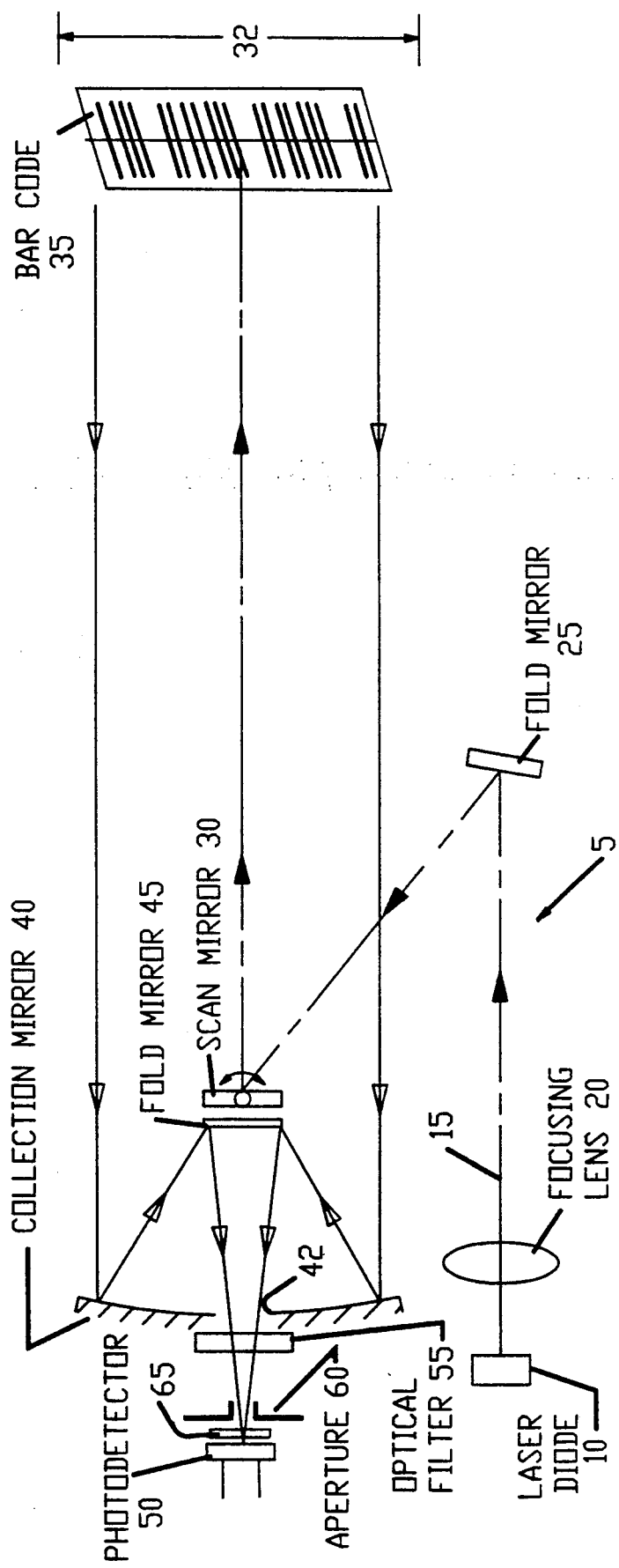
FIG. 1 is a schematic diagram a scanning system according to the present invention.

The preferred embodiments will now be described with reference to the drawings. FIG. 1 is a schematic diagram of a first scanning system 5 according to the present invention which is "on-axis". A light source illustrated as a laser diode 10 emits light 15 being aimed at the desired target shown as UPC bar code 35. Light 15 from the laser diode 10 is focused by a focusing lens 20. The focused beam is reflected off a first fold mirror 25 and is directed to a scan mirror 30. As the scan mirror 30 pivots, the beam scans over a scanning beam range 32. Light reflected or scattered off the bar code 35 bypasses the scan mirror 30 and is collected by a collection mirror 40 positioned behind the scan mirror 30. The collection mirror 40 directs the light to a second fold mirror 45 positioned just behind the scan mirror 30, between the collection mirror 40 and the scan mirror 30. The fold mirror 45 then directs the light through an aperture or hole 42 in the center of the collection mirror 40 to the detector 50 where the light is detected.

The optics of the scanning system are preferably constructed such that the focusing lens 20 achieves a focal point at a distance from the scanner at or near the anticipated position of the targeted bar code 35. The light source 10 may be any suitable light source including: a coherent light source such as a laser or laser diode, a non-coherent light source such as a light emitting diode, or combinations thereof.

The specific design of the collection mirror 40 will depend on various factors for a particular application including the type of light source, light source intensity distribution, target size and type, and external factors such as the desired distances to the object being read, lens diameter(s), and cost constraints. The collection mirror 40 may be spherical or aspheric and sized according to the particular application. Since the collection mirror 40 is not mounted with the pivoting scan mirror 30, the pivoting mechanism need only be sized for the mass of the much smaller scan mirror 30.

When the collection mirror is mounted on the scanning shaft, mirror size and complexity are sacrificed to achieve lightweight design. In addition, lightweight mirrors are more likely to deform. In the present system, the size of the collection mirror 40 is no longer restricted by the motor or scanning mechanism used in the system. The collection mirror 40 may be designed of any size and shape, including more complex shapes and geometries than other systems. Since the collection mirror 40 is not mounted on the scanning mechanism, it may have greater mass thereby achieving better structural stability.

The collection mirror 40 is mounted independently from the scan mirror 30 and is preferably stationary. Alternately, the collection mirror 40 may be on a drive mechanism which enables linear position of the collection mirror 40 to be adjusted for image focusing.

The system is capable of removing undesirable "ambient light" which passes through the scanner opening but is not the desired light returning from the bar code. One method is the placement of additional optical elements, such as an optical filter 55, in the light path behind the collection mirror 40 directly in front of the photodetector 50. The optical filter 55 may be designed to allow only the wavelength of light emitted by the light source 10 to pass on to the detector 50. The optical filter 55 may also serve to minimize ambient light problems caused by other light sources outside the bar code 35 but with wavelengths different than the scanner light source 10. If desired, the optical filter 55 may comprise a powered lens element (or a separate powered lens may be added) to provide telescopic or focusing affect on the light passing to the detector 50.

A second method for removing undesirable "ambient light" may be accomplished by the mirror geometry itself and the addition of an aperture 60 or spatial filter preferably positioned directly in front of the photodetector 50. The telescope optics, namely the collection lens 40 and first fold mirror 45 may also be designed to minimize the effective angular field of view to further minimize effects of stray light. Both the specific system geometry and the aperture 60 function to block light entering the system at extreme angles to the optical path, that is, off-axis light rays not coming from the bar code are inhibited from reaching the photodetector 50. Such a system design is particular advantageous in long-range scanning operations (such as six feet or more). Alternately, the aperture 60 may comprise an optical element such as a filter element having a coating designed to permit only "on-axis" light rays to pass therethrough.

The system configuration allows for convenient arrangement of additional optical elements. In addition to the optical filter 55 and the aperture 60, the system may also alternately include, for example, additional optical elements such as apertures or may be combined with another lens or filter 65 positioned between the collection mirror 40 and the detector 50. The particular relative position of the optical filter 55 and the aperture 60 illustrated is the preferred arrangement. Though it is desirable from a cost standpoint to place filters and lens elements near the detector so they can be of small size, such saving is offset by the ease of handling a slightly larger element and defects in a larger element.

Figure 2:
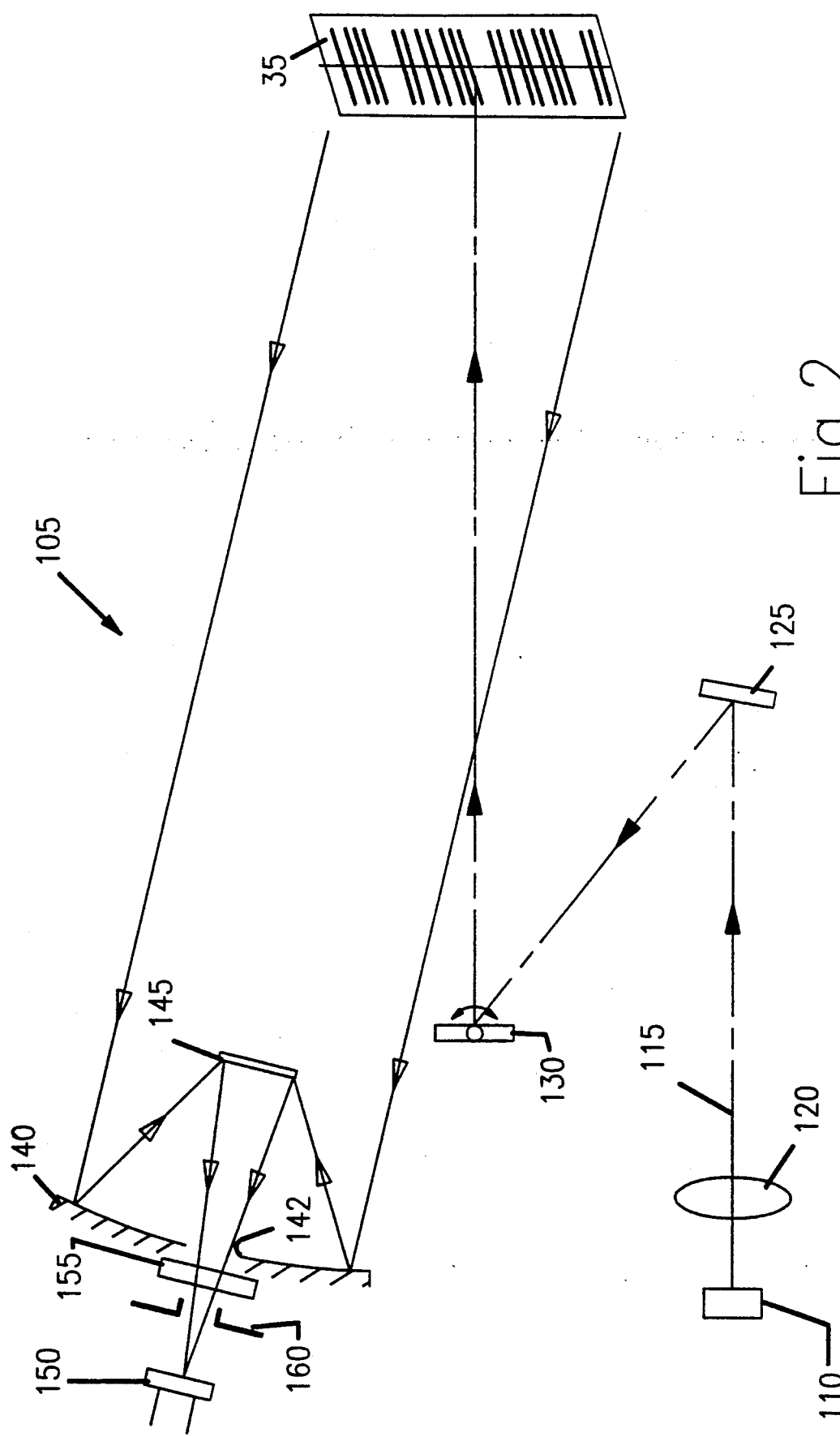
FIG. 2 is a schematic diagram illustrating an off-axis scanning system according to the present invention.

FIG. 2 is a schematic diagram of an alternative scanning system 105 which is "off-axis". A light source illustrated as a laser diode 110 emits light 115 being aimed at the desired target shown as UPC bar code 35. Light 115 from the laser diode 110 is focused by a focusing lens 120. The focused beam is reflected off a first fold mirror 125 and is directed to a scan mirror 130. Light reflected off the bar code 35 bypasses the scan mirror 130 and is collected by a collection mirror 140 positioned off-axis and to the side of the scan mirror 130. The collection mirror 140 directs the light to a second fold mirror 145 which in turn directs the light through an aperture 142 in the center of the collection mirror 140 to the detector 150 where the light is detected. The system 105 may include additional optical elements such as an aperture 160 and optical filter 155 to minimize off-axis and ambient light interference as previously described in the first embodiment.

Figure 3:
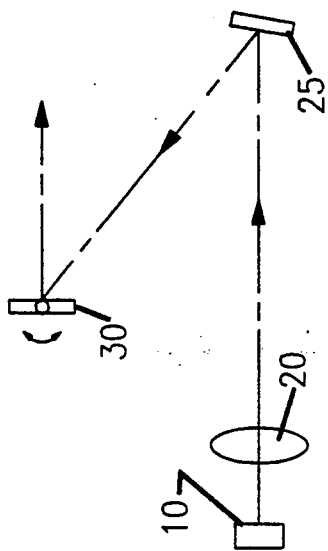
FIG. 3 is a schematic diagram illustrating an outgoing light scanning configuration.
Figure 4:
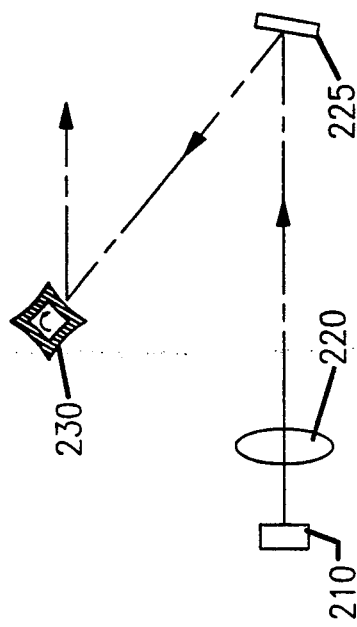
FIG. 4 is a schematic diagram illustrating an alternative outgoing light scanning configuration.
Figure 5:
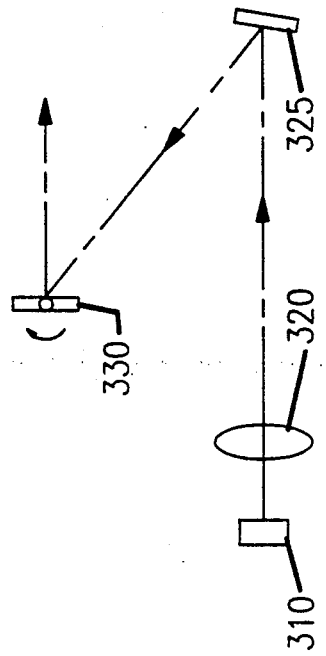
FIG. 5 is a schematic diagram illustrating another alternative outgoing light scanning configuration.

FIG. 3 diagrammatically illustrates the outgoing light scanning configuration as previously used in the embodiments of FIGS. 1 and 2. As shown in FIG. 3, the laser diode 10 directs a beam of light which is focused by lens 20, reflected off of fold mirror 25 toward an oscillating scan mirror 30 which directs the beam toward the object to be scanned. Though FIGS. 1-3 have illustrated only one outgoing light configuration, other configurations may be employed by the present design. FIGS. 4 and 5 illustrate examples of two such other configurations. In FIG. 5, scanning is accomplished by a rotating (or pivoting) polygon mirror 230. Light from the source 210 is focused by lens 220, reflected off of fold mirror 225 toward the polygon mirror 230 which directs the light beam toward the object to be scanned. The polygon mirror 230 may have different power mirror surfaces to accommodate different fields of view. If the mirror 230 is rotated, the incoming signal may require multiplexing. For example, as the polygon mirror 230 is rotated from aligning one mirror facet to another, the electronics are switched from a first signal processing electronics to a second signal processing electronics. Alternatively, a single facet of polygon mirror 230 may be selectively positioned in the light path and as the mirror 230 is pivoted or oscillated, light is reflected off that facet to provide a scan for a given focus distance. Each facet may be designed for a given focus distance or other scanning applications.

Another alternative configuration is shown in FIG. 5 where scanning is accomplished by an oscillating mirror 330. Light from the source 310 is focused by lens 320, reflected off of a fold mirror 325 toward the oscillating mirror 330 which directs the light beam toward the object to be scanned.

Figure 6:
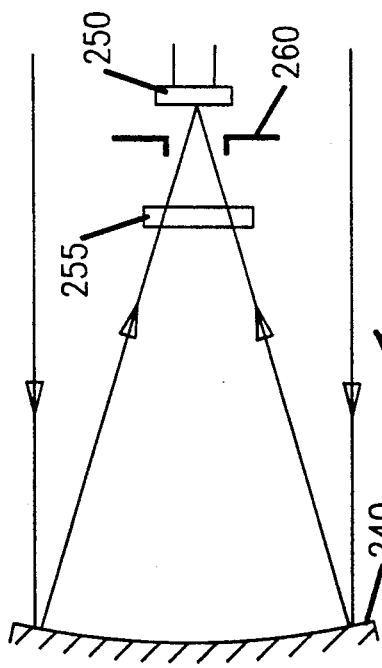
FIG. 6 is a schematic diagram illustrating an alternate light collecting configuration.

The present design may also employ alternate light collecting configurations. FIG. 6 illustrates a first alternative light collection scheme 205 comprised of a collection mirror 240 which directs and focuses incoming light reflecting off the bar code directly onto a detector 250. The collection mirror 240 may be on-axis in which case the detector 250 would be positioned directly behind the scan mirror (as in for example in the design of FIGS. 1, 3, 4, or 5) or off-axis as in the design of FIG. 2. The collection system 205 may include additional optical elements such as an aperture 260 and/or an optical filter 255 positioned between the collection mirror 24 and the detector 250 to minimize off-axis and ambient light interference as described in previous embodiments.

Figure 7:
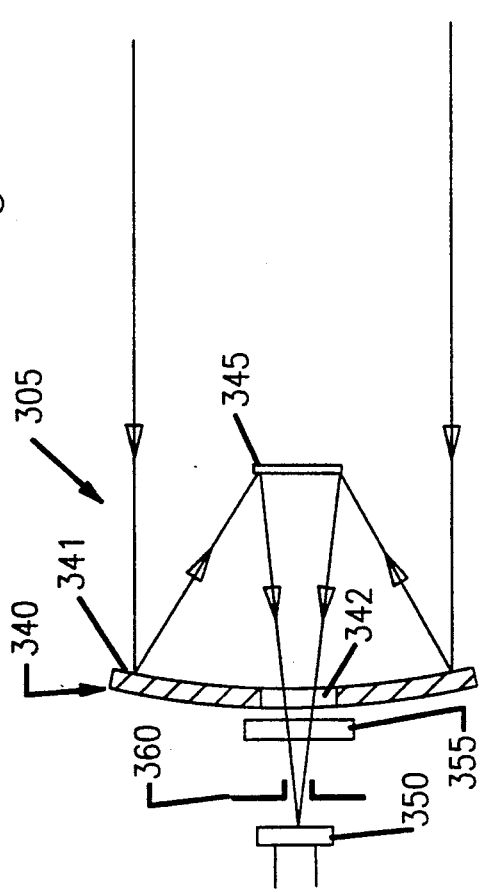
FIG. 7 is a schematic diagram illustrating another alternate light collecting configuration.

FIG. 7 illustrates a second alternative collection scheme 305 comprised of a collection mirror 340 having an outer reflective section 341 and an inner transmissive section 342. The outer reflective section 341 directs incoming light reflecting off the bar code onto a fold mirror 345. The collection mirror 340 may be on-axis in which case the fold mirror 345 would be positioned directly behind the scan mirror (as in for example in the design of FIGS. 1, 3, 4, or 5) or off-axis as in the design of FIG. 2. Light is then reflected off the fold mirror 345 and directed through the transmissive section 342 of the collection mirror 340 to the photodetector 350. The collection system 305 may include additional optical elements such as an aperture 360 and/or an optical filter 355 (or a spatial filter such as in FIG. 1) positioned between the collection mirror 340 and the detector 350 to minimize off-axis and ambient light interference as described in previous embodiments.

The collection mirror 340 (or any of the collection mirrors disclosed) may be constructed from any suitable material including glass, plastic, metal or combinations thereof. The collection mirror 340 of FIG. 7 may be constructed with different materials in the outer reflective section 341 and the inner transmissive section 342 to achieve the desired transmissive or reflective characteristic. Alternately, the sections could be made of the same material but have different coatings or surface layers to achieve the desired transmissive or reflective result. In the embodiments of FIG. 1 or FIG. 2, the inner transmissive section is "missing" i.e. it is merely an aperture. Alternatively, the inner transmissive section 342 may comprise an optical element such as an optical filter or a spatial filter thereby serving a dual function of not only permitting transmission of light therethrough but also minimizing or reducing off-axis and/or ambient light interference at the detector 350.

Thus, a scanning system and method for reading data have been shown and described. It is intended that any one of the disclosed outgoing light configurations may be combined with any one of the collecting configurations. Though certain examples and advantages have been disclosed, further advantages and modifications may become obvious to one skilled in the art from the disclosures herein. The invention therefore is not to be limited except in the spirit of the claims that follow.

I claim:

1. An optical system for data reading, comprising:
   a light source generating an optical beam along an outgoing optical path toward an object to be scanned;
   a detector for detecting light reflected off the object;
   a scan mirror in the outgoing optical path directing light toward the object;
   a collection mirror positioned behind the scan mirror for collecting light reflecting off the object, the collection mirror having a central aperture;
   a fold mirror positioned between the collection mirror and the scan mirror for directing light along a collected light path from the collection mirror through the central aperture of the collection mirror to the detector.

2. An optical system according to claim 1 further comprising a focusing lens positioned in the outgoing light path.

3. An optical system according to claim 1 further comprising an optical filter positioned in the collected light path between the collection mirror and the detector.

4. An optical system according to claim 3 wherein the optical filter permits transmission only of light having the same wavelength as that of the optical beam generated by the light source.

5. An optical system according to claim 1 further comprising an aperture positioned in the collected light path between the collection mirror and the detector.

6. An optical system according to claim 5 wherein the aperture inhibits off-axis light from reaching the detector.

7. An optical system according to claim 1 wherein the light source is selected from the group consisting of: lasers, laser diodes, coherent light sources, light emitting diodes, non-coherent light sources, and combinations thereof.

8. An optical system according to claim 1 wherein the optical system comprises a laser scanner.

9. An optical system according to claim 1 wherein the scan mirror is selected from the group consisting of a mirror means for producing a desired scan pattern, a pivoting mirror, a rotating mirror, a polygon mirror.

10. An optical system according to claim 1 wherein the collection mirror is selected from the group consisting of: spherical mirror, aspheric mirror.

11. An optical system for data reading, comprising:
    a light source generating an optical beam along an outgoing optical path toward an object to be scanned;
    a detector for detecting light reflected off the object;
    a small scan mirror in the outgoing optical path directing light toward the object; and
    a collection mirror for collecting light reflecting off the object and directing the light toward the detector,
    wherein said collection mirror is of significantly greater size than said small scan mirror and is mounted independently therefrom.

12. An optical system according to claim 11 further comprising a fold mirror positioned between the collection mirror and the object being scanned for directing light along a collected light path from the collection mirror through a central portion of collection mirror to the detector.

13. An optical system according to claim 12 wherein the central portion of the collection mirror is an aperture.

14. An optical system according to claim 12 wherein the collection mirror includes a light reflective outer portion and a light transmissive central portion.

15. An optical system according to claim 14 wherein the light transmissive central portion of the collection mirror is selected from the group consisting of (a) an aperture, (b) an optical filter, (c) a spatial filter, (d) an optical material having a light transmissive surface, and (d) an optical material having a light transmissive coating.

16. An optical system according to claim 11 wherein the collection mirror is selected from the group consisting of: spherical mirror, aspheric mirror.

17. A method for data reading comprising the steps of:
    emitting light from a light source toward an object to be read;
    passing the light through focusing lens to a first fold mirror;
    reflecting the light off the first fold mirror toward a scan mirror;
    directing light off the scan mirror over a scanning range on the object to be read;
    collecting incoming light, which has reflected or scattered off the object and which has bypassed the scan mirror, in a collection mirror located behind the scan mirror and focusing the light on a second fold mirror positioned behind the scan mirror; and
    reflecting the light off the second fold mirror through the collection mirror to a detector.

18. A method for data reading according to claim 17 wherein the step of emitting light comprises emitting light from a light source selected from the group consisting of: lasers, laser diodes, coherent light sources, light emitting diodes, non-coherent light sources, and combinations thereof.

19. A method for data reading according to claim 17 wherein the scan mirror is selected from the group consisting of a mirror means for producing a desired scan pattern, a pivoting mirror, a rotating mirror, a polygon mirror.

20. A method for data reading comprising the steps of:
    emitting light from a light source toward an object to be read;

passing the light through focusing lens and directing the light toward a scan mirror;

directing light off the scan mirror over a scanning range on the object to be read;

collecting light reflected or scattered off the object in a collection mirror located behind the scan mirror and focusing the light on a fold mirror positioned behind the scan mirror; and reflecting the light off the fold mirror and through the collection mirror to a detector, wherein the fold mirror directs light through a hole in the center of the collection mirror.

21. A method for data reading comprising the steps of:

emitting light from a light source toward an object to be read;

passing the light through focusing lens and directing the light toward a scan mirror;

directing light off the scan mirror over a scanning range on the object to be read;

collecting light reflected or scattered off the object in a collection mirror located behind the scan mirror and focusing the light on a fold mirror positioned behind the scan mirror; and reflecting the light off the fold mirror and through the collection mirror to a detector, wherein the collection mirror includes (a) a light reflective outer portion which reflects incoming light toward the fold mirror and (b) a light transmissive central portion through which light from the fold mirror may pass to the detector.

22. A method for data reading comprising the steps of:

emitting light from a light source toward a scan mirror;

reflecting the light off the scan mirror toward an object to be read;

pivoting the scan mirror to direct light over a scanning range on the object to be read;

collecting incoming light, which has reflected or scattered off the object and which has bypassed the scan mirror, in a collection mirror, the collection mirror being mounted independently from the scan mirror;

directing the light from the collection mirror to a fold mirror positioned between the collection mirror and the scan mirror;

directing the light off the fold mirror to a detector.

23. A method for data reading comprising the steps of:

emitting light from a light source toward a scan mirror;

reflecting the light off the scan mirror toward an object to be read;

pivoting the san mirror to direct light over a scanning range on the object to be read;

collecting light reflected or scattered off the object in a collection mirror, the collection mirror being mounted independently from the scan mirror;

directing the light from the collection mirror onto a fold mirror; and reflecting the light off the fold mirror back through a central portion of the collection mirror to a detector.

24. A method for data reading according to claim 23 wherein the central portion of the collection mirror comprises a hole in the center of the collection mirror.

25. A method for data reading comprising the steps of:

emitting light from a light source;

aiming the light from the light source toward an outgoing mirror;

directing the light off the outgoing mirror over a scanning range toward an object to be read;

collecting incoming light, which has reflected or scattered off the object and which has bypassed the outgoing mirror, in a collection mirror;

focusing the incoming light being collected toward a fold mirror;

reflecting the incoming light off the fold mirror through a portion of the collection mirror and then to a detector.

26. A method for data reading according to claim 25 wherein the collection mirror has optical power for focusing the incoming light on the fold mirror.

27. A method for data reading comprising the steps of:

emitting light from a light source;

aiming the light from the light source toward an outgoing mirror;

directing the light off the outgoing mirror over a scanning range toward an object to be read;

collecting incoming light, which has reflected or scattered off the object and which has bypassed the outgoing mirror, in a collection mirror, the collection mirror having optical power and focusing the light toward a detector, the detector being located between the outgoing mirror and the collection mirror.

* * * * *